(12) United States Patent
Duffy

(10) Patent No.: US 9,658,462 B1
(45) Date of Patent: May 23, 2017

(54) METHODS AND SYSTEMS FOR MANUFACTURING A REAR PROJECTION SCREEN AND A SETUP FOR DISPLAYING A SIMULATED 3D HOLOGRAM

(71) Applicant: John Paul Duffy, Toronto (CA)

(72) Inventor: John Paul Duffy, Toronto (CA)

(73) Assignee: ARHT Media Inc., Toronto (CA)

( * ) Notice: Subject to any disclaimer, the term of this patent is extended or adjusted under 35 U.S.C. 154(b) by 0 days.

(21) Appl. No.: 15/297,317

(22) Filed: Oct. 19, 2016

(51) Int. Cl.
| | |
|---|---|
| *G03B 21/604* | (2014.01) |
| *H04N 9/31* | (2006.01) |
| *G02B 27/22* | (2006.01) |
| *G02B 27/26* | (2006.01) |
| *G03B 21/62* | (2014.01) |
| *G03B 21/606* | (2014.01) |
| *H04N 13/04* | (2006.01) |

(52) U.S. Cl.
CPC ......... *G02B 27/2278* (2013.01); *G02B 27/26* (2013.01); *G03B 21/604* (2013.01); *G03B 21/606* (2013.01); *G03B 21/62* (2013.01); *H04N 13/0495* (2013.01); *H04N 13/0497* (2013.01); *H04N 9/3141* (2013.01); *H04N 9/3147* (2013.01)

(58) Field of Classification Search
CPC ...... G03B 21/56; G03B 21/585; G03B 21/60; G03B 21/604; G03B 21/606; H04N 9/3141; H04N 9/3147; H04N 13/0495; G02B 27/2278
USPC .................................................. 353/449, 460
See application file for complete search history.

(56) References Cited

U.S. PATENT DOCUMENTS

| | | | |
|---|---|---|---|
| 8,172,400 B2 | 5/2012 | O'Connell et al. | |
| 8,203,600 B2* | 6/2012 | Plut | H04N 9/3147 348/51 |
| 8,711,061 B2 | 4/2014 | Reichow et al. | |
| 2008/0304013 A1* | 12/2008 | Seo | H04N 13/0459 353/8 |

* cited by examiner

*Primary Examiner* — William C Dowling
*Assistant Examiner* — Ryan Howard
(74) *Attorney, Agent, or Firm* — Bajwa IP Law Firm; Haris Zaheer Bajwa

(57) ABSTRACT

A method and structure for displaying a simulated 3D image which may be projected utilizing front projectors and two screens, where the front screen may be a rear-projecting screen with a linear polarization film attached and a background screen which may contain a further image which varies in a programmed manner in keeping with the actions being portrayed by images on the front screen.

9 Claims, 6 Drawing Sheets

METHODS AND SYSTEMS FOR MANUFACTURING A REAR PROJECTION SCREEN AND A SETUP FOR DISPLAYING A SIMULATED 3D HOLOGRAM

TECHNICAL FIELD

This invention relates to projection apparatus, and in particular the invention relates to a projection apparatus which is used in a manner so that a viewer will see a video presentation which comprises a simulated three dimensional (3D) image. In detail, the 3D video may be projected utilizing a front projector and two screens, where the front screen may be a rear-projecting screen and a background screen which may contain a further image which varies in a programmed manner in keeping with the actions being portrayed by images on the front screen.

BACKGROUND

The present disclosure finds its genesis in a theatrical illusion which is widely known as "Pepper's ghost". In this illusion, a viewer is made to believe that he is seeing an article which does not, in fact, exist in the setting or circumstances being viewed. The techniques involved in presenting Pepper's ghost are described hereafter. However, for now, a brief description and history of Peppers ghost is provided.

In order for the classical Peppers ghost illusion to work properly, the viewer must see clearly into a main setting, but not see into a hidden room. Unknown to the viewer, the viewer is also viewing the main setting through an angled piece of glass which, because of its placement, may be both translucent and reflective. By changing the lighting in the hidden room, the viewer may view a reflection of the lit contents of the hidden room, on the glass panel. Thus, the illusion is controlled by its illumination, and will appear and disappear when the lighting of the object, person, or the like, is turned on or off, respectively. As a result, an object or person which is reflected in the "mirror" section of the glass (e.g. the reflective surface of the glass) may seem to appear or disappear, or change into another object. While this illusion is over 100 years old, the same effect has been employed since at least the 1960's in certain modern theme parks, where objects such as reflected animated props may create the appearance of translucent "ghosts" which appear to be moving through a particular setting and interacting with props in that physical particular setting. Moreover, the images appear to be three dimensional and demonstrate a parallax effect with respect to other items on the stage.

Typically, in recent applications, a polymeric film, drawn tight within a metal frame, is used to replace the glass panel, and a projection device is used to create the image to be displayed on the polymeric film. As an example, U.S. Pat. No. 8,172,400 (O'Connell et al.) describes a projection apparatus which requires a first projection device that is arranged to generate a virtual three dimensional object by projection of the image onto to a reflected/translucent polymer film. A second projection device projects a background image; and a light source projects light onto the virtual three dimensional image. A stage arrangement may also be provided, which is placed behind the screen, upon which a presenter or actor, or a prop, or both, may be located, in order that the presenter or prop, interact with the virtual image.

In more recent applications, such as those described in US Patent publication No. US 2013/0300728 (Reichow et al.), the polymeric film or glass panel showing the reflection is replaced by a transparent front display device, such as an transparent LCD display device. In this approach, the reflective surface with its projected image, is no longer required since the virtual image may be displayed directly on the transparent front display. A background display device is positioned visually behind the transparent front display, and a background image is shown or projected directly on the background display device. The images shown on the background display device may be coordinated with the images on the transparent front display in order to create an apparent parallax effect which provides images which are similar to images from the Pepper's Ghost technique.

However, unless a visual "ghost" effect is desired, it has typically been necessary to employ a black background surface behind the virtual image so as to avoid any background image showing through the virtual image. This is because if the viewer were to see the background image through the front image, it would destroy the "holographic" effect of the virtual image.

In scenarios where a front projector with two screens (a rear-projecting screen and a background blank screen) are used, use of a front projector to generate an image on the rear-projecting screen (front screen) is problematic to the audience's viewing experience because of spill, that is, light is projected beyond the screen surface to other surfaces in the viewing environment. Spill creates a distraction to the audience away from the front screen and contributes to ambient light levels in the room. The increased light and the distraction of spill negatively impacts the audience's suspension of disbelief as they see part or all of the projected image on other surfaces as well as the actual screen, thereby negating the impact, believability of the interactive, hologramic experience.

As such, it would be beneficial to provide a newly designed and manufactured rear-projecting screen setup described herein, wherein the screen apparatus is capable of dealing with the issue of spill. The present inventors have unexpectedly discovered that the at least some of these benefits may be provided by utilizing a novel arraignment, comprising a novel rear-projecting screen, which may be utilized to view holograms by a plurality of viewers, in normal ambient lighting conditions.

SUMMARY

An object of the invention is to provide new and improved methods and systems for generating and utilizing a rear-projection screen with a polarized film attached for displaying simulated 3D display images. The following presents a simplified summary of exemplary embodiments of the present disclosure in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter.

In an exemplary embodiment, a method for displaying a simulated 3D image to an audience. The method may comprise attaching a first linear polarization lens with an east-west polarization to a first front projector and attaching a second linear polarization lens with a north-south polarization to a second front projector. The method may further comprise creating a front screen, which is a rear-projecting screen, wherein the creating the front screen comprises, hanging a stretched out gauze vertically, applying at least a first fire resistant coating on the stretched out gauze and drying the first fire resistant coating, applying, using spray application, three semi-translucent diffusing coatings, wherein each of the three semi translucent diffusing coatings are applied at intervals of thirty minutes, and applying at least a second first resistant coating on the three semi-translucent diffusing coatings. The method may further include attaching a polarized film with a north-south polarization to the front screen, wherein the polarized film is the same size as the front screen, and placing a background screen directly behind the front screen, projecting first image data using the first front projector and projecting second image data using the second front projector, wherein interrelation of the first data and the second data image leads to an apparent parallax effect and display of a simulated 3D image.

In another exemplary embodiment, a simulated three-dimensional display device, for displaying a hologram is disclosed. The display device may comprise a first linear polarization lens with an east-west polarization attached to a first front projector, a second linear polarization lens with a north-south polarization attached to a second front projector, a front screen, which is a rear-projecting screen, attached to a polarized film with a north-south polarization, where front screen includes a stretched out gauze vertically, a first fire resistant coating directly on the stretched out gauze, three semi-translucent diffusing coatings, and a second first resistant coating on the three semi-translucent diffusing coatings, and a background screen directly behind the front screen, where the first front projector is configured to project first image data and the second front projector is configured to project second image data, wherein interrelation of the first data and the second data image leads to an apparent parallax effect and display of a simulated 3D image.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for the purpose of illustration and description only and are not intended as a definition of the limits of the present disclosure. Embodiments of the present disclosure will now be described by way of example in association with the accompanying drawings in which.

DETAILED DESCRIPTION

Figure 1:
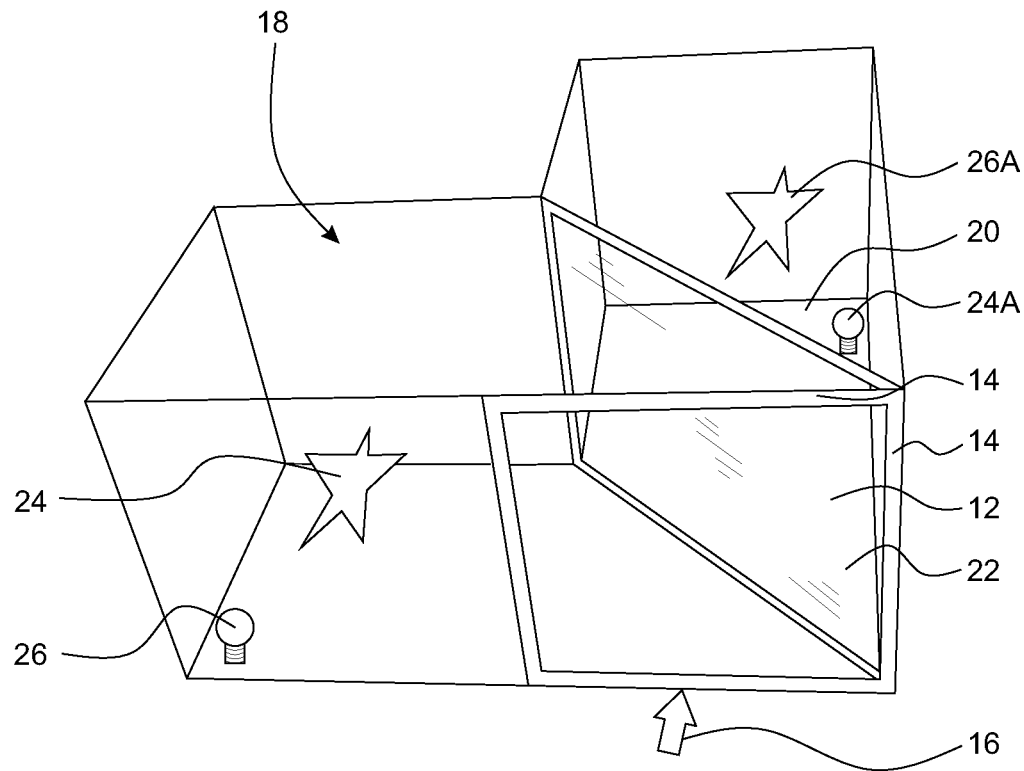
FIG. 1 is a sketch showing the general layout and functioning principles of a prior art Pepper's Ghost installation.

The novel features which are believed to be characteristic of the present invention, as to its structure, organization, use and method of operation, together with further objectives and advantages thereof, will be better understood from the following discussion.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. The figures discussed below provide details regarding exemplary systems that may be used to implement the disclosed functions.

Some concepts are described in form of steps of a process or method. In this form, certain operations are described as being performed in a certain order. Such implementations are exemplary and non-limiting. Certain operations described herein can be grouped together and performed in a single operation, certain operations can be broken apart into plural component operations, and certain operations can be performed in an order that differs from that which is described herein, including a parallel manner of performing the operations. The operations can be implemented by software, hardware, firmware, manual processing, and the like, or any combination of these implementations. As used herein, hardware may include computer systems, discrete logic components, such as application specific integrated circuits (ASICs) and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be understood that when used herein, the term "the three dimensional (3D) image" or "3D image" may be an actual 3D image or may be an illusion of a 3D image that is created based on generation and display of a two-dimensional (2D) image. The illusion may be created by creating a parallax effect between a front screen and a background screen. The display content between the front screen and back screen may be synchronized. When viewing the illusion of the 2D image with the parallax effect, a viewer may experience that a 3D image is being displayed between the two screens.

FIG. 1 is a sketch showing a classic arrangement by which the Pepper's ghost illusion was exhibited starting in the last half of the 19th century. A stage, typically a proscenium stage, is shown at 12 in FIG. 1, and has a proscenium 14. It will be seen that the left hand side of the stage is open; that is, there is no wall, wing drapery, or the like. However, a viewer looking at the stage 12 in the direction of arrow 16 sees nothing of the apparatus and setup at the left-hand side of the stage 18. Moreover, all of the structure at the left-hand side of the stage, commonly referred to as a Blue Room 18 (although it is usually black), is kept dark. That is, there is no illumination in the blue room 18, and the stage 20 is typically brightly lit. A glass panel 22 is set at an angle to the viewing direction 16. Whatever is behind the glass 22 is clearly seen by the viewer.

Under normal lightly conditions, there is no reflection seen on the front face of the glass 22 from the setting in the blue room 18.

Objects 24 and 26 are placed in the blue room 18. When illumination is turned on in blue room 18, a reflection of what is in the blue room 18 is seen in the glass 22, but appears to provide a virtual image 24A and 26A, which can be seen by the viewer. When the lighting in the blue room 18 is discontinued, the images 24A and 26A, appear to disappear.

The present system is a variation of the Pepper's Ghost illusion wherein a front image is provided on a front screen, and can be made to be interrelated to images appearing on a background screen. This creates parallax in the system, which provides a simulated 3D effect. The present system utilizes a novel method of manufacturing the front screen, which is a rear projection screen, along with a method of projecting image data which leads to a cheaper and more efficient way to display simulated 3D images. The rear projection screen is manufactured as explained below in the explanation provided for FIG. 4. Exemplary embodiments of the present disclosure also use polarized lens and a polarized film as described below with respect to FIGS. 2 and 3 to provide this unique and novel setup which creates better image quality and eliminates spill.

Figure 2:
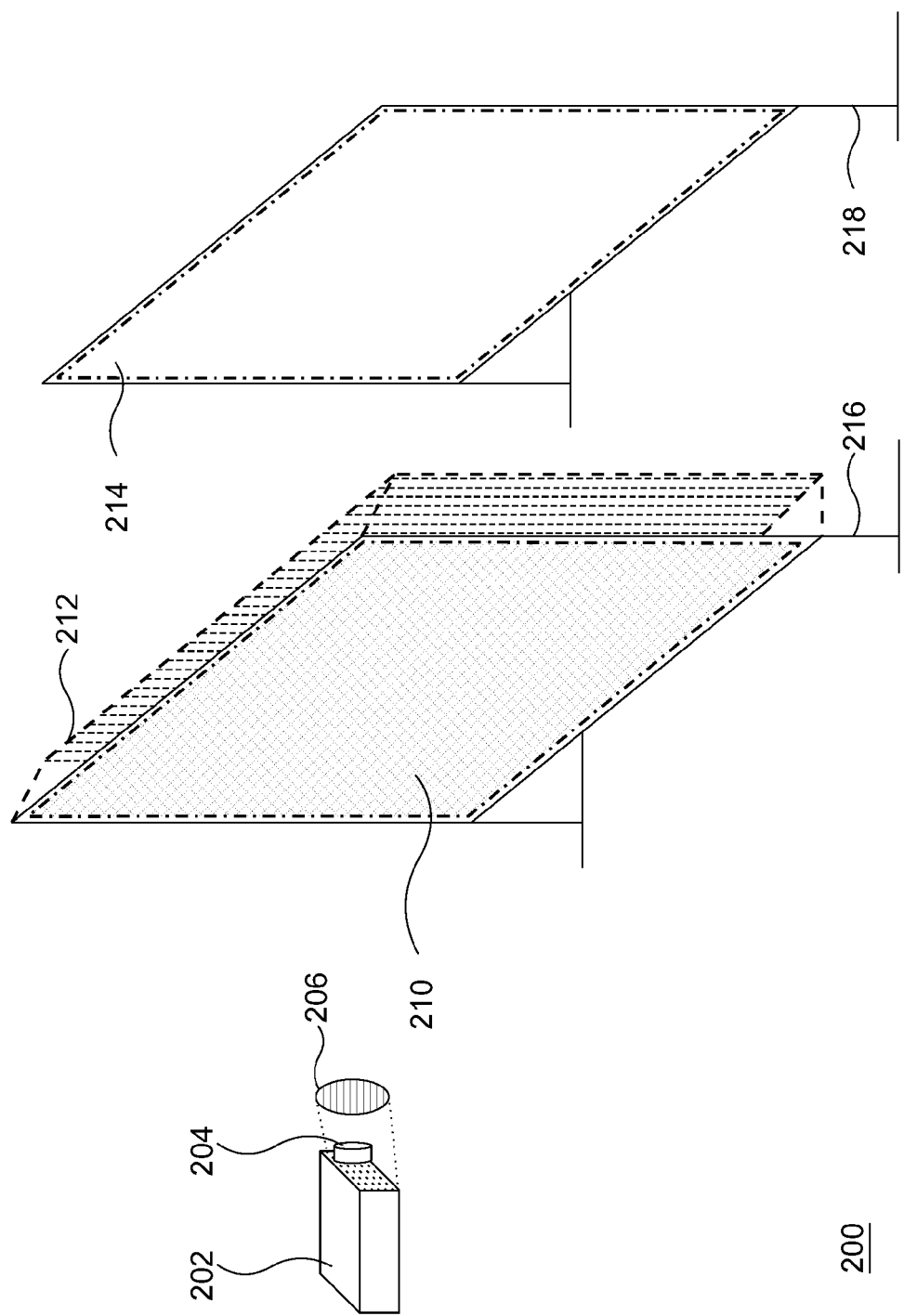
FIG. 2 displays an exemplary environment where a front projector placed from the perspective of an audience and a rear projection screen as a front screen are utilized, consistent with exemplary embodiments of the present disclosure.

FIG. 2 displays an exemplary environment where a front projector is placed from a perspective of an exemplary audience and a rear projection screen as a front screen are utilized, consistent with exemplary embodiments of the present disclosure. Specifically, FIG. 2 displays environment 200 that includes projector 202 with projection lens 204. In an exemplary embodiment, a video image may be projected by projector 202. Project 202 may be mounted or placed in front of an exemplary display screen or screens on the audience side of a venue, room or location. Linear polarization lens 206 may be placed in front of projection lens 204 through which any images would be projected onto an exemplary screen. In exemplary embodiments, linear polarization lens 206 may have a x-axis orientation, that is, it may have an east-west polarization. Therefore, any video or image data passed through linear polarization lens 206 will have any image data along the y-axis removed from it. In exemplary embodiments, linear polarization lens 206 may comprise of glass or acrylic. Linear polarization lens 206 may be attached to projector 202 and/or lens 204 using an exemplary mount (not illustrated). The mount may be attached in a manner that the lens are rotatable in order to change the alignment of the linear polarization axis relative to the rear projection screen 210 (front screen) and the linear polarized film 212 behind the front screen. In exemplary embodiments, the mount may also be used to adjust a distance between linear polarization lens 206 and lens 204 of projector 202. In an exemplary embodiment, to determine a minimum distance between linear polarization lens 206 and lens 204 so that the heat generated by the projector image does not damage linear polarization lens. Accordingly, first a minimum size in inches of exemplary linear polarization lens 206 may be calculated using the following formula (The square root of the (projector lumens divided by 145). For example, a 14,500 lumen projector would require a 10"×10" lens (14,500 divided by 145=100; the square root of 100 is 10). In exemplary embodiments, linear polarization lens may be mounts on to lens 204. In this example, linear polarization lens 206 may be placed at a maximum distance from the projector such that the entire projected image is projected through the polarized lens. That is to say that no part of a projected image bleeds beyond linear polarization lens 206, in which case parts of the projected image would not be polarized.

In other embodiments, linear polarization lens 206 are mounted on custom built aluminium frame which allows the lens to be rotated to optimize the polarization effect lens without being directly attached to projector 202 or lens 204.

Any images from projector 202 may be displayed on rear projection screen 210 to which is attached linear polarized film 1412. Accordingly, in exemplary embodiments, a video image/light exits the polarization lens 206 with the light eliminated on one axis (the y-axis) leading for the image to remain intact and undistorted as it hits rear projection screen 210.

In exemplary embodiments, rear projection screen 210 may be a nylon tulle material that is treated with fire retardant, an optical optimizing paint and finally a second application of fire retardant, as explained below in further detail with respect to FIG. 4. Rear projection screen 210 reflects the image back to the audience and also allows transmission of the video image through the surface. This transmitted polarized image/light is then transmitted to linear polarized film 212 behind rear projection screen 210. In exemplary embodiments, polarized film 212 may have a y-axis orientation, that is, it may have a north-south polarization. Accordingly, linear polarized film 212 is constructed and oriented such that the axis of polarization is 90 degrees to the polarization orientation of linear polarized lens 206 mounted on projector 202. Stand 216 may hold up rear projection screen 210 with polarized film 212. Polarized film 212 may be the same size as rear projection screen 210. In embodiments, polarized film 212 is tensioned on stand 214 to create a smooth, flat surface, which is parallel to rear projection screen 210 (front screen). Therefore, when light or the video image that has passed through linear polarization lens 206 and rear projection screen 210 hits polarized film 212, it is polarized on the remaining axis thus eliminating any light exiting the polarized film and thereby solving the issue of spill. Specifically, any image/light or video data projected by projector 202 through linear polarization lens 206 has only allows image data along the x-axis to pass through become of the polarization orientation of linear polarization lens 206. Subsequently, due to the y-axis polarization orientation of polarized film 212, the remaining image data along the x-axis is blocked from being passed through preventing spill.

Stand 218 may hold up rear projection plane 214. In exemplary embodiments, rear projection plane 214 may be drapery, a screen, or any other similar surface. In exemplary embodiments, a rear projector (not illustrated) may also be placed between rear projection screen 210 and rear projection plane to project a video image to be displayed on rear projection plane 214. Rear projection plane 214 may reflect the image from the second projector (not illustrated) back through the rear projection screen 210 and polarized film 212. Although one axis of light (x-axis orientation) is eliminated from the rear projection screen 210 due to the exemplary combination of rear projection screen 210 and polarized film 212 (y-axis polarization orientation), the video image/light on rear projection plane 214 may still be visible to the audience. That is because polarized film has a north-south polarization, image data from rear projection plane 214 on one of the axis may be transmitted back through rear projection screen 210 and polarized film 212 to be visible to an audience. Accordingly, a first set of images from rear projection screen 210 and a second set of images on rear projection plane 214 may be displayed to an audience. In exemplary embodiments, rear projection plane 214 may extend beyond rear projection screen 210. The size may be dependent based on an audience cone which includes audience viewing angle, distance between rear projection screen 210 and rear projection plane 214, and geometry of a venue.

In an exemplary embodiment, first program material is projected by a first projector to be displayed on exemplary front screen (rear projection screen 210) and second program material are projected by a second projector to be displayed on exemplar back screen (rear projection plane). The first program material and the second program material may be edited and synchronized one with the other so that the images from the back screen appear to be interrelated to, or merge into, the program material on the front screen, and thus provide a simulated 3D viewing experience.

It will be noted that the images of the first program material and the images of the second program material may be independent. However, in keeping with the present invention, preferably the images of the first program material and the images of the second program material are synchronized. Typically, synchronization of the first program material and the second material is preferably under the control of a computer, or some other computerized device. Synchronization of the images moving from display device to display device, may be provided by this arrangement.

The apparatus of the present invention is preferably arranged so that images from the first program material and/or the second program material are altered or edited, in such a manner so that any chosen image from first program material displayed on the front screen, will create an image which will appear to be aligned with an area of the second program material presented on the back screen. In a preferred arrangement, the first program material will appear to be superimposed, or in front of, the edited second program material on the back screen. In one arrangement, the second program material may be altered so that no image is provided in the area behind the image provided in the first program material. As such, the first program material image is provided without any image from the second program material being superimposed on, or under, the first program image.

Still further, the editing and placement of the first program material image and the edited area of the second program material image are such that the chosen image of the first program material and the edited area of the second program material may be made to move in any direction, relative one to the other, from frame to frame of the virtual image and the second program material image. As such, the directions of movement from frame to frame of the virtual image, and the edited area of the second program material image can be in opposite directions, so as to provide an enhanced illusion of movement one with respect to the other.

Figure 3:
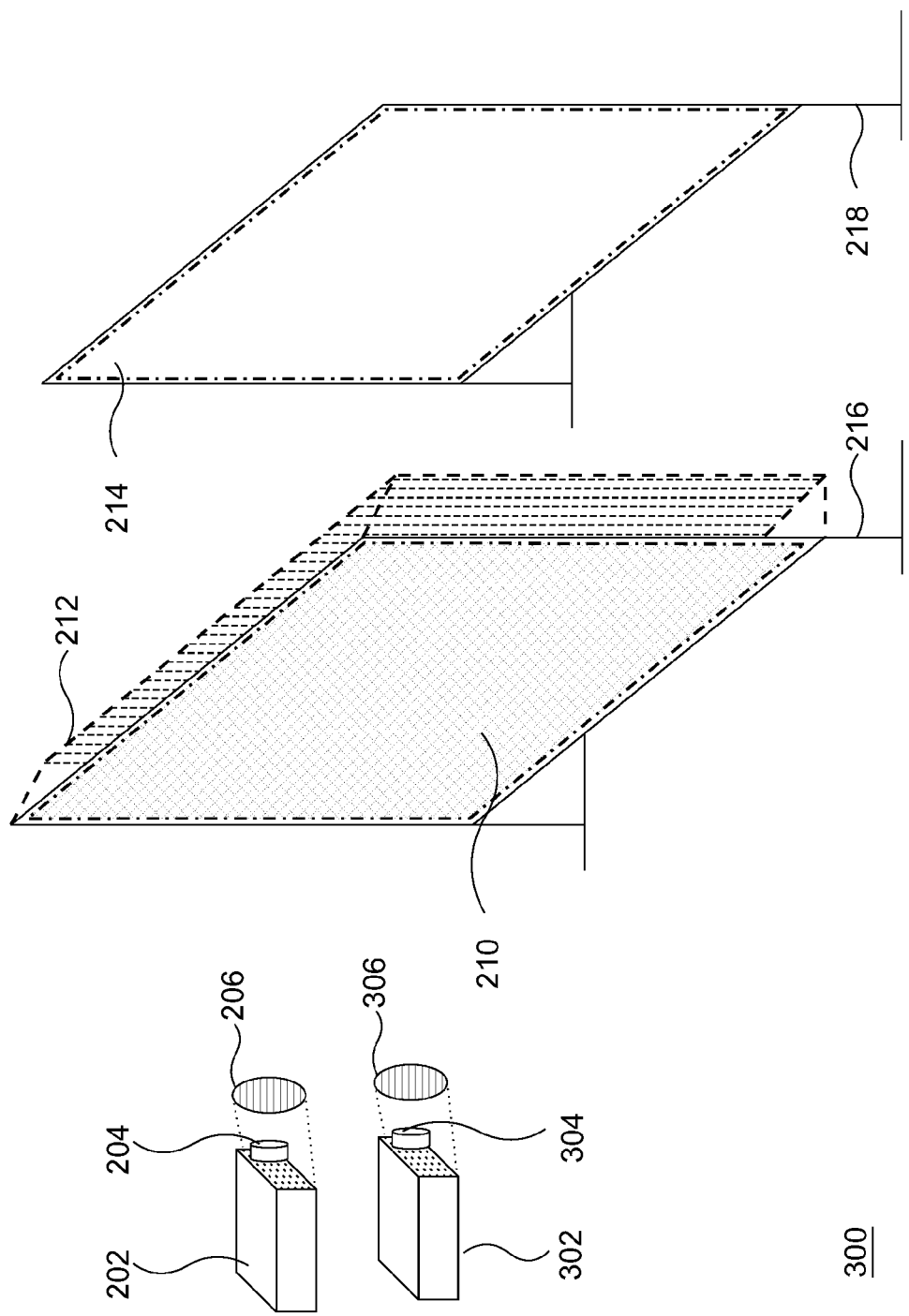
FIG. 3 displays an exemplary scenario, utilizing two projectors each with polarization lens attached places next to each other, consistent with exemplary embodiments of the present disclosure.

FIG. 3 displays an exemplary scenario, utilizing two projectors each with polarization lens attached places next to each other, consistent with exemplary embodiments of the present disclosure. Specifically, environment 300 contains all the elements of environment 200 of FIG. 2 and also includes a second rear projector 302 with lens 304 is placed next to projector 202. The second rear projector 302 may be utilized to project videos or image data to be displayed on rear projection plane 214. A linear polarization lens 306 may be attached to projector 302, analogously to how linear polarization lens 206 may be attached to projector 202, with similar ability to vary angles. Linear polarization lens 306 may have a y-axis orientation, that is, it may have a north-south polarization. Accordingly, since linear polarization lens 306 and polarization screen 212 have the same orientation, video image data from projector 306 would pass along on one axis, the north-south axis, to rear projection screen 214 and reflect back to an exemplary audience. Therefore, first program material may be displayed on rear projection screen 210 and second program material may be displayed on rear projection plane 214, displaying a simulated 3D image as discussed above.

Figure 4:
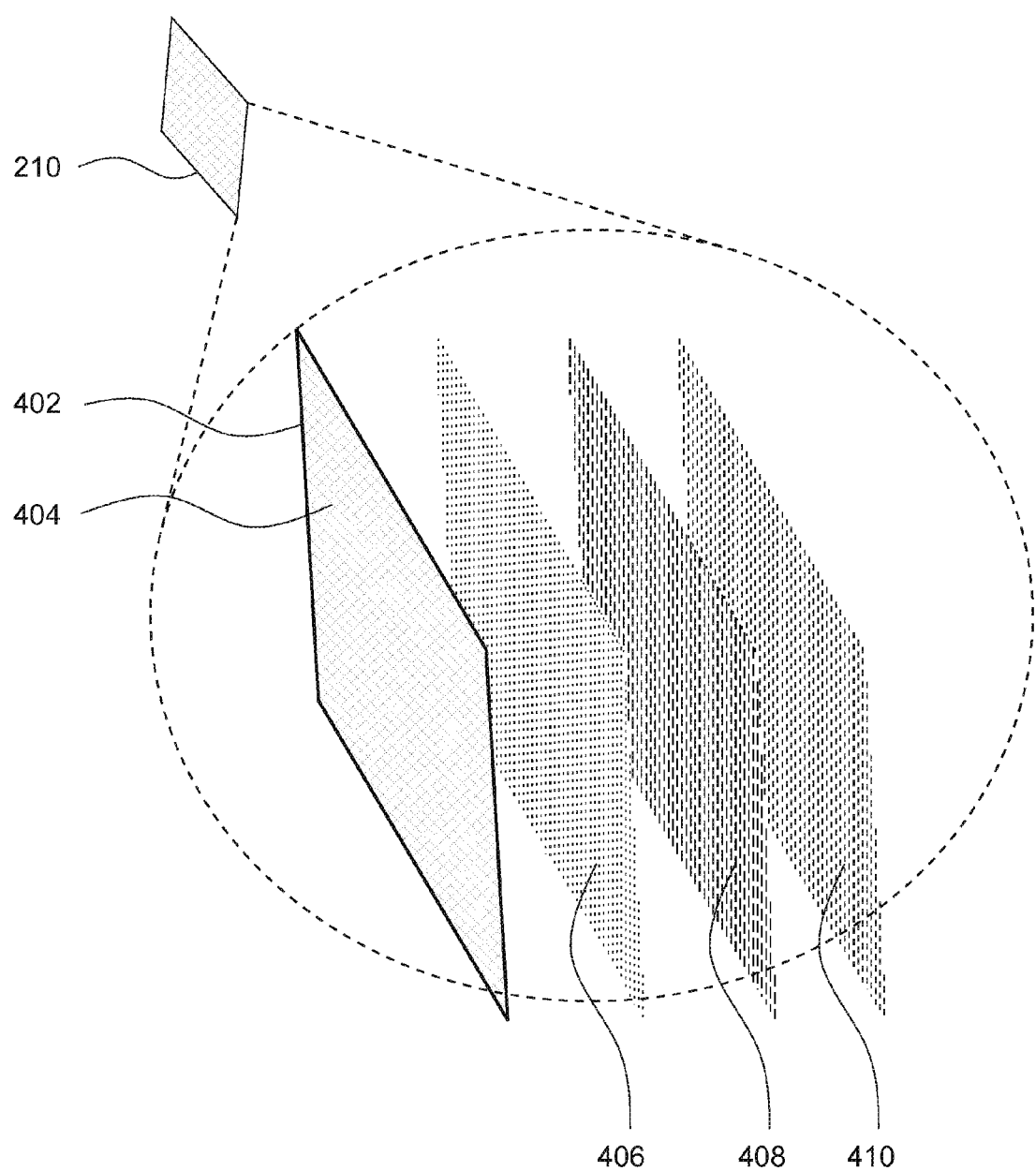
FIG. 4 displays a detailed view of rear projection screen (front screen), consistent with exemplary embodiments of the present disclosure.

FIG. 4 displays a detailed view of the front screen 210 (rear projection screen), consistent with exemplary embodiments of the present disclosure. Gauze 404 may contain border 402. Border 402 may comprise of a velcro attachment strip around the entire border of gauze 404. Border 402 may be utilized for mounting and tensioning front screen 210. The illustrations 406, 408 and 410 are all liquid applications applied to the gauze with a spray gun. Each layer is applied sequentially after the previous layer has dried and cured. Specifically, when utilized, front screen 210 should be stretched out flat for most efficient performance. On gauze 404, fire resistant 406 may be applied using spray application. Then coating 408 may be applied behind fire resistant 406. Coating 408 may be a semi-translucent diffusing coating. Coating 408 may have a gloss of 15, an ideal spreading rate of 302.4 sq ft/gal, with a recommended film thickness of 1.5 Mils Wet and 0.50 Mils Dry. In exemplary embodiments, before application of fire resistant 306 or coating 408, gauze 404 (or a similar fabric) is suspended from the ceiling and pulled tight so it has no wrinkles in it. For coating 408, a thin coat may be applied three times with about half an hour allotted between coats to allow for it to dry. In exemplary embodiments, three coats create the ideal combination of transparency and signal penetration-less than two coats leads to negative impact on video appearance by making it looked soft while any additional coating, there is impact on the quality of viewing any images on any back screen or plane. In exemplary embodiments, coating 308 may also be applied using spray application. In such a scenario, an exemplary spray gun may be set to allow a high amount of air to into the mixture creating a misting of coating 308 onto gauze 404. In such application, the exemplary spray gun may be used to spray at an angle and not at a ninety degrees or perpendicular angle to gauze 404. Coating 408 may be applied by using a sweeping motion, with the exemplary spray gun positioned about 0.75 to 1.25 feet away from gauze 404 first in a horizontal direction and then in the vertical direction. In an exemplary embodiment, first coating 406 may be applied followed by coating 408 that may be a semi-translucent diffusing coating, followed by final coating 410 of fire retardant. Each application of coatings 406, 408 and 410 require a minimum of 3 hours to dry. Another layer of fire resistant 410 may be applied behind coating 408 using spray application. In embodiments, fire resistant 410 may be similar to fire resistant 306.

Figure 5:
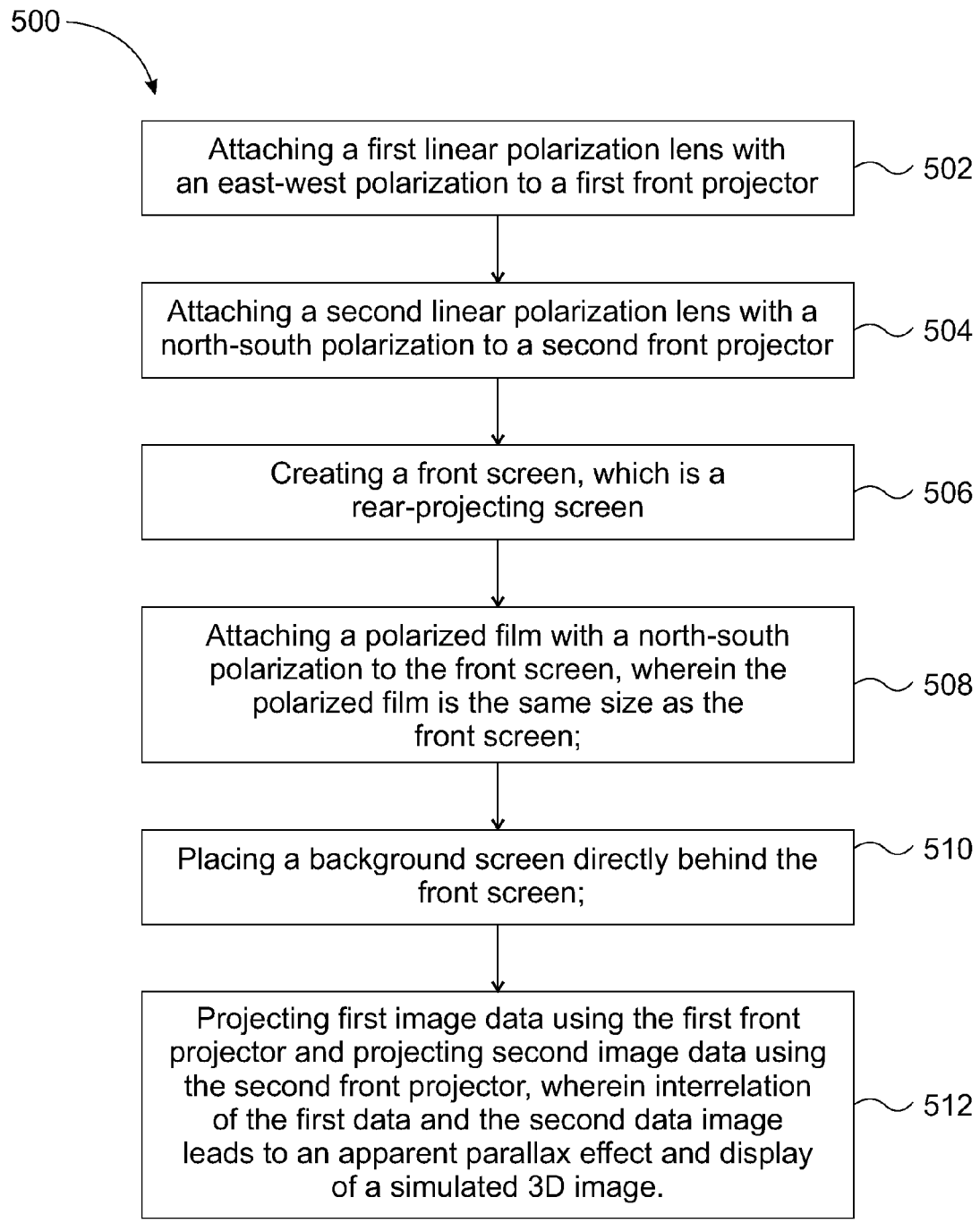
FIG. 5 illustrates an exemplary method for displaying a simulated 3D image to an audience, consistent with exemplar embodiments of the present disclosure.

FIG. 5 illustrates an exemplary method for displaying a simulated 3D image to an audience, consistent with exemplar embodiments of the present disclosure.

Method 500 may include one or more steps as described above with regards to the description of FIGS. 2 through 5. In detail, step 502 may comprise attaching a first linear polarization lens with an east-west polarization to a first front projector. For example, linear polarization lens 206 may be attached to project 202.

Step 504, may comprise 504 attaching a second linear polarization lens with a north-south polarization to a second front projector. For example, linear polarization lens 306 may be attached to project 302.

In exemplary embodiments, respective linear polarizations lens 206 and 306 may simply be placed in front of respective projectors 202 and 30 using stand-alone stands.

Figure 6:
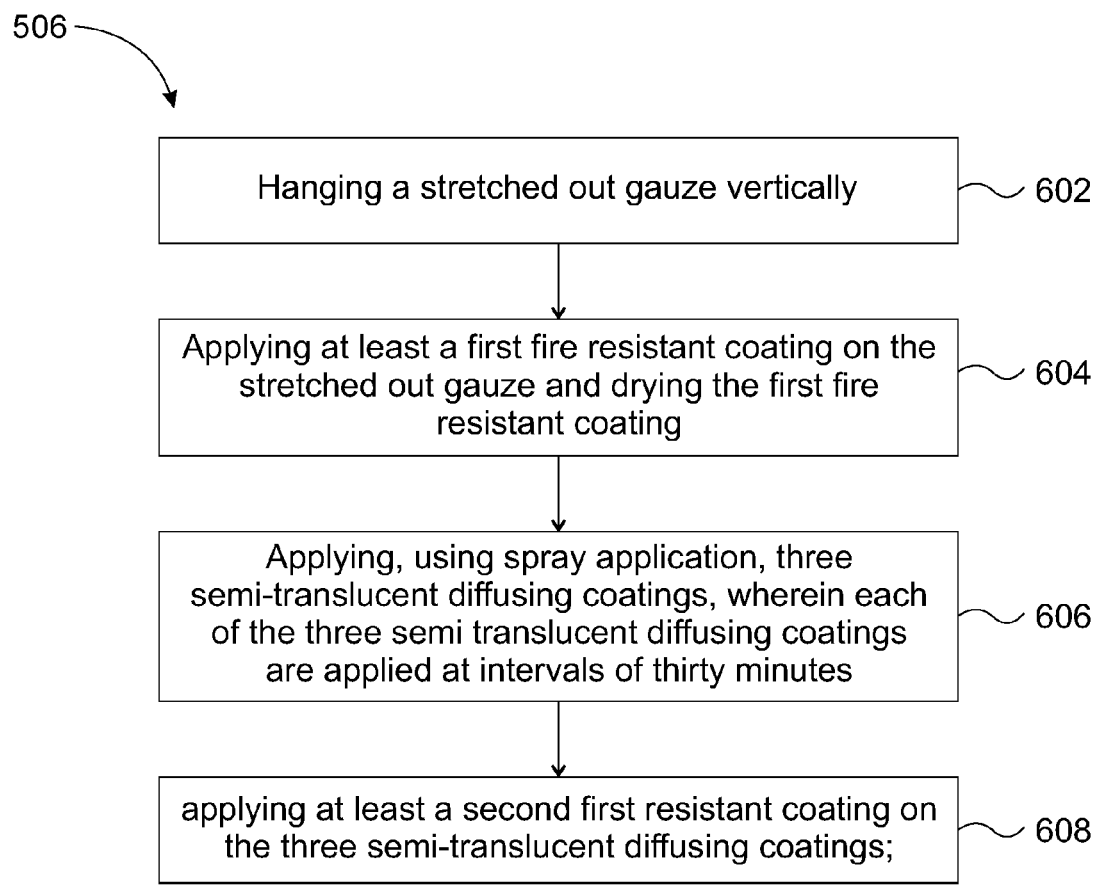
FIG. 6 illustrates an exemplary method for creating a front screen which is a rear-projecting screen, consistent with exemplary embodiments of the present disclosure.

Step 506 may comprise of creating a front screen, which is a rear-projecting screen. FIG. 6 illustrates an exemplary method for creating a front screen which is a rear projection screen, consistent with exemplary embodiments of the present disclosure. Therefore, step 506, may comprise of a first step 602 which comprises hanging a stretched out gauze vertically. Step 604 may comprise of applying at least a first fire resistant coating on the stretched out gauze and drying the first fire resistant coatings. Step 606 may comprise of applying, using spray application, three semi-translucent diffusing coatings, wherein each of the three semi translucent diffusing coatings are applied at intervals of thirty minutes. Step 608 may comprise of applying at least a second first resistant coating on the three semi-translucent diffusing coatings.

Step 508 may comprise of attaching a polarized film with a north-south polarization to the front screen, wherein the polarized film is the same size as the front screen. For example, polarized film 212 may be attached to rear projecting screen 210.

Step 510 may comprise of placing a background screen directly behind the front screen. For example, rear projection plane 214 may be placed behind an exemplary front screen.

Step 512 may comprise of projecting first image data using the first front projector and projecting second image data using the second front projector, wherein interrelation of the first data and the second data image leads to an apparent parallax effect and display of a simulated 3D image. Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed:
1. A method for displaying a simulated 3D image to an audience, comprising:
  attaching a first linear polarization lens with an east-west polarization to a first front projector;
  attaching a second linear polarization lens with a north-south polarization to a second front projector;
  creating a front screen, which is a rear-projecting screen, wherein the creating the front screen comprises:
    hanging a stretched out gauze vertically;
    applying at least a first fire resistant coating on the stretched out gauze and drying the first fire resistant coating;
    applying, using spray application, three semi-translucent diffusing coatings, wherein each of the three semi translucent diffusing coatings are applied at intervals of thirty minutes; and
    applying at least a second first resistant coating on the three semi-translucent diffusing coatings;
  attaching a polarized film with a north-south polarization to the front screen, wherein the polarized film is the same size as the front screen;
  placing a background screen directly behind the front screen;
  projecting first image data using the first front projector and projecting second image data using the second front projector, wherein interrelation of the first data and the second data image leads to an apparent parallax effect and display of a simulated 3D image.

2. The method of claim 1, further comprising:
removing image data in a y-axis orientation from the first image data using the first polarization lens.

3. The method of claim 2, further comprising:
removing remaining image data of the first image data in an x-axis orientation using the polarized film.

4. The method of claim 3, further comprising:
removing image data of the second image data in an x-axis orientation using the second polarized lens.

5. The method of claim 4, further comprising:
reflecting back remaining image data of the second image data from the rear projection screen.

6. The method of claim 1, wherein the rear projection screen is arranged to display a first image of a first program material which is to be observed by an audience viewer, and the rear projection plane is arranged to display a second image of a second program material which is to be observed by a viewer, wherein the rear projection screen and the rear projection plane are separated to provide the apparent parallax effect between the first image and the second image.

7. The method of claim 5, wherein the first program material and the second program material are edited and synchronized one with the other so that the images from the background display device appear to be interrelated to, or merge into, the program material on the front display device, and thus provide a simulated 3D viewing experience.

8. A simulated three-dimensional display device, for displaying a hologram, comprising:

a first linear polarization lens with an east-west polarization attached to a first front projector;

a second linear polarization lens with a north-south polarization attached to a second front projector;

a front screen, which is a rear-projection screen, attached to a polarized film with a north-south polarization, where the front screen includes a stretched out gauze vertically, a first fire resistant coating directly on the stretched out gauze, three semi-translucent diffusing coatings, and a second fire resistant coating on the three semi-translucent diffusing coatings; and a background screen directly behind the front screen, wherein the first front projector is configured to project first image data and the second front projector is configured to project second image data, wherein interrelation of the first data and the second data image leads to an apparent parallax effect and display of a simulated 3D image.

9. The three-dimensional display device of claim 8, wherein:

the first linear polarization lens is configured to eliminate image data in a_y-axis direction from the first image data; and the second linear polarization lens is configured to eliminate image data in a x-axis direction from the second image data.

* * * * *